US006785284B1

(12) United States Patent
Hagen

(10) Patent No.: US 6,785,284 B1
(45) Date of Patent: Aug. 31, 2004

(54) INTERLEAVEMENT FOR TRANSPORT OF FRAMES AND CELLS

(75) Inventor: Gunnar Hagen, Santa Clara, CA (US)

(73) Assignee: Infineon Technologies North America Corp., San Jose, CA (US)

( * ) Notice: Subject to any disclaimer, the term of this patent is extended or adjusted under 35 U.S.C. 154(b) by 719 days.

(21) Appl. No.: 09/637,334

(22) Filed: Aug. 10, 2000

(51) Int. Cl.[7] .......................... H04L 12/40; H04L 12/56
(52) U.S. Cl. ............................. 370/395.5; 370/395.7; 370/444; 710/27; 710/28
(58) Field of Search .................. 370/230, 235, 370/362, 395.4, 395.42, 395.52, 395.53, 395.7, 395.72, 421, 423, 438, 443–444, 447, 450–451, 465–466, 455; 710/22–28

(56) References Cited

U.S. PATENT DOCUMENTS

| 5,598,575 A | * | 1/1997 | Dent et al. .................... 710/28 |
| 5,633,870 A | * | 5/1997 | Gaytan et al. ............... 370/235 |
| 5,659,749 A | * | 8/1997 | Mitchell et al. ............ 709/108 |
| 5,923,658 A | * | 7/1999 | Shtayer et al. .............. 370/399 |
| 5,948,089 A | * | 9/1999 | Wingard et al. ............ 710/107 |
| 6,115,373 A | * | 9/2000 | Lea ............................ 370/355 |
| 6,501,731 B1 | * | 12/2002 | Chong et al. ............. 370/230.1 |
| 6,549,981 B2 | * | 4/2003 | McDonald et al. ......... 711/114 |
| 2002/0057708 A1 | * | 5/2002 | Galbi et al. ................. 370/429 |
| 2002/0146013 A1 | * | 10/2002 | Karlsson et al. ......... 370/395.6 |
| 2003/0103526 A1 | * | 6/2003 | McBride et al. ............ 370/466 |
| 2003/0110364 A1 | * | 6/2003 | Tang et al. ................. 711/168 |
| 2003/0123448 A1 | * | 7/2003 | Chang ..................... 370/395.1 |

FOREIGN PATENT DOCUMENTS

| EP | 0 550 164 A1 | 7/1993 | ........... G06F/13/28 |
| EP | 1 059 588 A1 | 12/2000 | ........... G06F/13/28 |

* cited by examiner

Primary Examiner—Hassan Kizou
Assistant Examiner—Gregory Sefcheck
(74) Attorney, Agent, or Firm—Fish & Richardson P.C.

(57) ABSTRACT

A DMA system includes a plurality of transmit-receive pairs (102, 104) for communicating on a bus. A DMA controller (108) supervises bus handling. The DMA controller (108) includes a priority controller (114), a bus sniffer (112), and a context machine (116). The bus sniffer (112) and context machine (116) identify block transfers as frame or cell transfers and supervise interleaving. The priority controller (114) resolves the priority of each of the constituent transfers of the frame or cell block transfers using a matrix of priority tokens.

15 Claims, 4 Drawing Sheets

Figure Priority-token matrix overview

Figure time-relation of Service-Windows to transfers within Scan-Windows

Figure Priority-token matrix overview

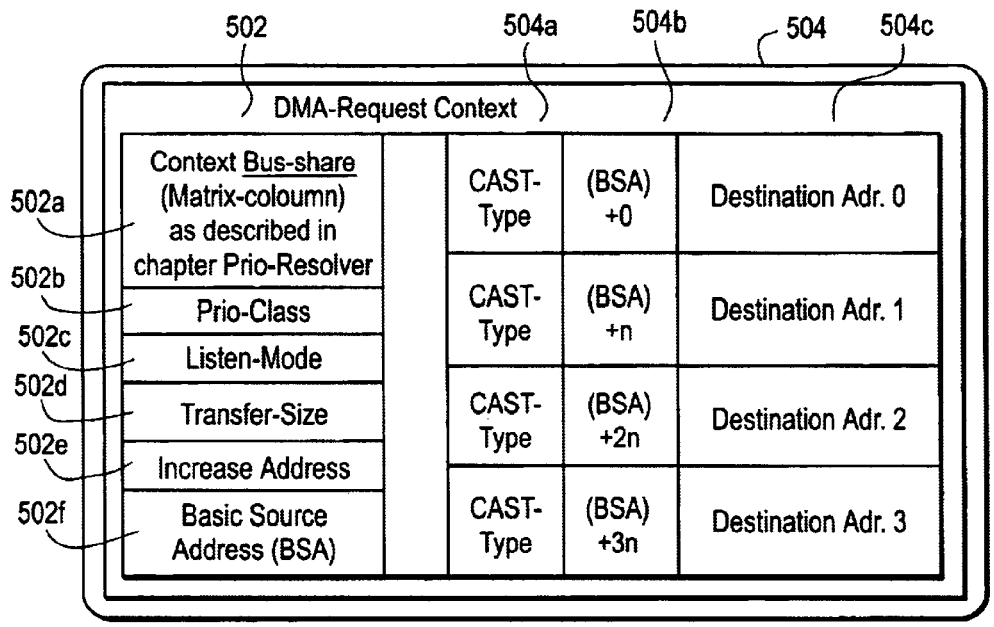
FIG. 6  *figure DMA-Request Context*
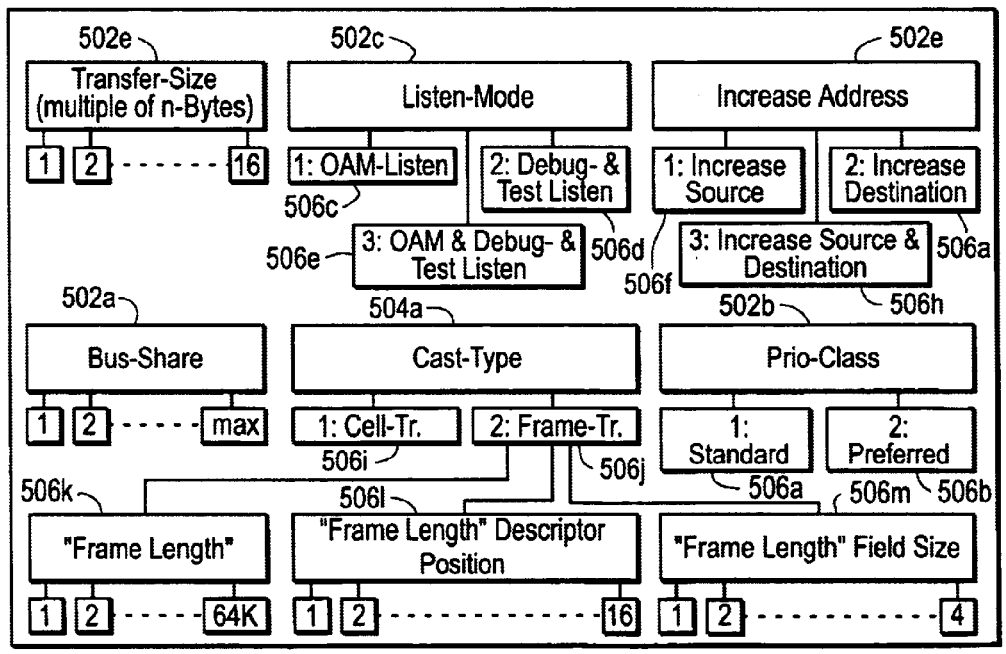
FIG. 7  *figure Configuration-cases*

INTERLEAVEMENT FOR TRANSPORT OF FRAMES AND CELLS

BACKGROUND OF THE INVENTION

1. Field of the Invention

The present invention relates to data communication systems and, in particular, to an improved direct memory access (DMA) handler for an Internet Protocol (IP) over asynchronous transfer mode (ATM) system.

2. Description of the Related Art

The Internet Protocol (IP) is one of the most popular networking protocols in use today. Briefly, IP encapsulates data into packets or frames of varying length. However, IP does not provide true quality of service (QoS), which is a requirement of multimedia messaging. Asynchronous transfer mode (ATM) systems pack data into equal length cells and also provide for true QoS.

Systems that employ IP over ATM must therefore provide for handling of the varying length IP frames and the fixed length ATM cells without doing violence to the ATM QoS requirements. One approach is to receive the IP frames, disassemble them, and reassemble them as ATM cells. This does not necessarily provide an optimal result, however.

As such, there is a need for an improved system for handling IP frames and ATM cells.

SUMMARY OF THE INVENTION

These and other drawbacks in the prior art are overcome in large part by a direct memory access device (DMA) in accordance with the present invention. Briefly, the DMA device supports data transfers from multiple requesters over a shared media by interleaving frames and cells.

A DMA controller according to an implementation of the present invention includes a bus driver, a bus sniffer, a priority controller and a context machine. The bus sniffer is used to identify a cast type of a transfer on the bus, i.e., whether the transfer is a frame or cell transfer. The priority controller asserts a signal allowing access to the bus. The context machine stores system context. The controller supervises interleaving of frames and cells on the bus and asserts a frame end signal when a frame has been transmitted.

BRIEF DESCRIPTION OF THE DRAWINGS

A better understanding of the invention is obtained when the following detailed description is considered in conjunction with the following drawings in which:

FIG. 6 and FIG. 7 illustrate context assignment according to an implementation of the invention.

DETAILED DESCRIPTION OF THE INVENTION

FIGS. 1–7 illustrate an improved system and method for transporting frames and cells. A DMA system includes a plurality of transmit-receive pairs for communicating on a bus. A DMA controller supervises bus handling. The DMA controller includes a priority controller, a bus sniffer, and a context machine. The bus sniffer and context machine identify block transfers as frame or cell transfers and supervise interleaving. The priority controller resolves the priority of each of the constituent transfers of the frame or cell block transfers using a matrix of priority tokens.

Figure 1A:
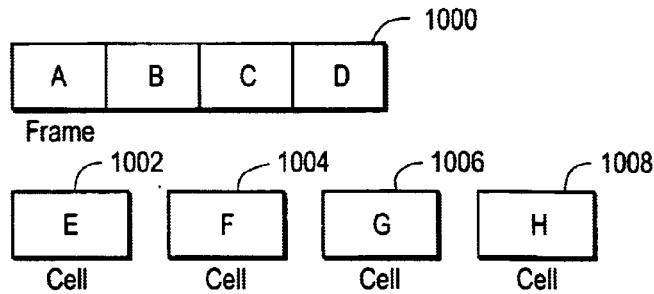
FIG. 1 is a diagram illustrating interleaving of frames and cells according to an implementation of the present invention.

FIG. 1A illustrates a frame 1000 and a plurality of cells 1002, 1004, 1006, 1008. The frame 1000 is of arbitrary length. As will be explained in greater detail below, a frame header includes frame length information, which is used to divide the frame into equal length elements A–D. The cells 1002, 1004, 1006,1008 are of fixed length.

Figure 1B:

FIG. 1B illustrates interleavement of the frame and cells according to an implementation of the present invention. As will be described in greater detail below, a DMA controller according to an implementation of the present invention provides control signals to interleave the transmission of the frame elements A–D with the cells E–H.

Figure 2:
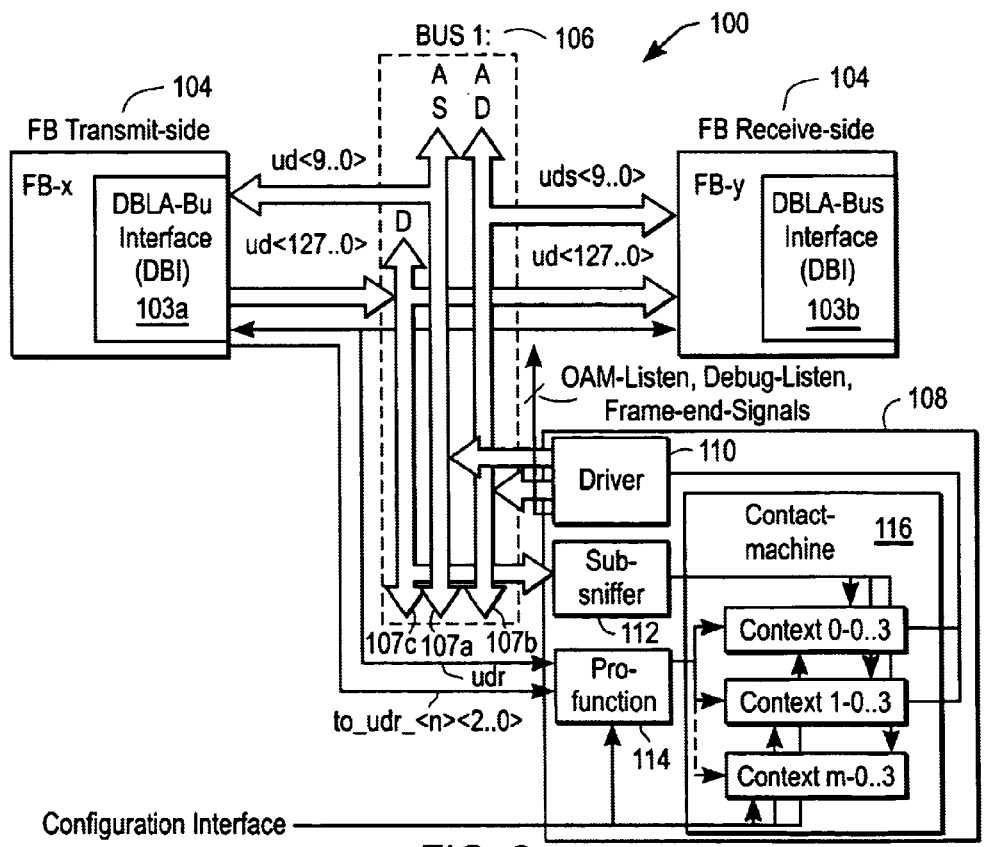
FIG. 2 is a block diagram of a processing system according to an implementation of the invention.

Turning now to the drawings and, with particular attention to FIG. 2, a system 100 according to a particular implementation of the invention is shown therein and generally identified by the reference numeral 100. As shown, the system includes a plurality of functional blocks 102,104. As will be explained in greater detail below, each functional block 102,104 includes a DMA bus interface 103a, 103b, respectively. In operation, one functional block 102 operates as a transmitter and another functional block 104 functions as a receiver. The transmit block and the receive block are referred to collectively as a transfer pair. Typically, the system 100 will include more than one transfer pairs, but only one is shown for sake of simplicity. Thus, the figure is exemplary, only.

The system 100 further includes a bus 106 to which the functional blocks 102, 104 are coupled. The bus 102 may be implemented having source address 107a, destination address 107b, and data 107c channels.

Also coupled to the bus 106 is a DMA control unit 108 according to an implementation of the invention. The DMA control unit 108 includes a bus driver 110, a bus sniffer 112, a priority resolver 114, and a context machine 116, as will be explained in greater detail below.

More particularly, on the first transfer of a block transfer, the bus sniffer 112 reads the length field of the frame which is to be transferred, i.e., the parameters frame-length, frame-length descriptor position, and frame-length field size. A down-counter (not shown) is loaded by the frame-length value divided by the number of bytes which are transferred in parallel (i.e., the bus-width). The counter-value is decreased on each transfer. When the downcounter reaches zero (0), a frame-end signal is asserted.

The priority resolver 114 resolves concurrent transfer requests and grants transfer requests on a prereserved basis using tokens. The context machine 116 includes a plurality of registers and determines the associated response to each user data request. The driver 110 drives the bus 106 based on the register contexts. The bus sniffer 112 listens to the first transfer within a block transfer and determines the number of required transfers to complete the block transfer. At the end of the block transfer, the bus sniffer 112 asserts a frame-end signal.

As will be explained in greater detail below, the priority resolver 114 grants a transfer pair access to the bus on a per transfer basis, with a token assigned to each transfer. Thus, for example, with reference to FIG. 1B, each cell E–H and each frame element A–D represents a transfer and has assigned to it an associated token. The priority resolver 114 resolves the priority of any pending transfers. The context machine 116 is used to determine the specific handling of the component transfers of the block transfer(s).

Figure 3:
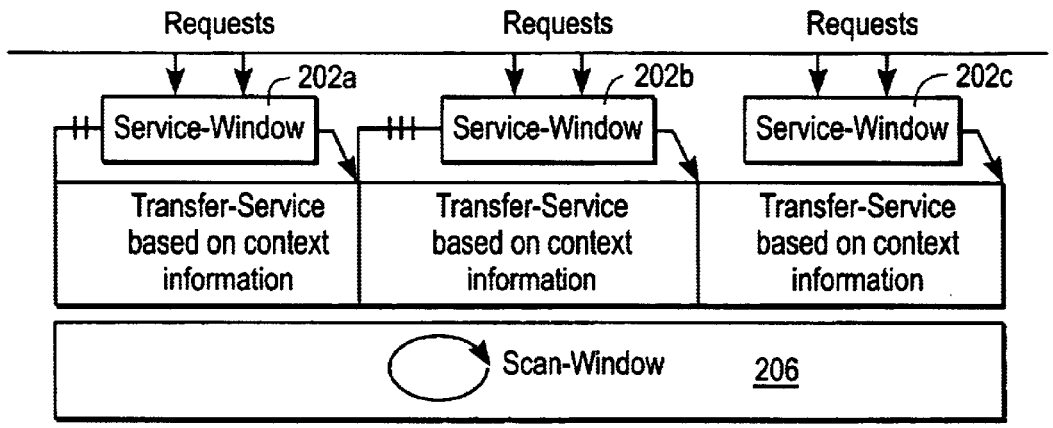
FIG. 3 is a diagram illustrating scan and service windows according to an implementation of the invention.

As noted above, the function of the priority resolver 114 is based on "priority-tokens" and an assignment of "static rank" and "dynamic rank." Transfers are based on the use of the tokens in "scan windows" and "service windows." The tokens allow prereserving bus load share for each transfer-pair. More particularly, FIG. 3 illustrates the use of scan and service windows. Shown are a scan window 206 and a plurality of service windows 202a–202c. For each service window 202a–202c, a transfer service, based on the context information, occurs.

A service-window 202 is the time in which the dynamic rank is determined among all pending transfer-requesters. A scan-window 206 is a duration of time having a length equal to n service-windows 202 plus the duration of the performed transfer-services. Even if no requests are made during a service window 202, the service window period will elapse before a next one begins. Thus, each scan window 206 has a minimum duration of n service windows.

As will be explained in greater detail below, priority resolution itself is based on token assignment with reference to "static" and "dynamic" ranks. The static rank is based on a position within a matrix of n+1 (=rows) *m+1 (=columns). It is valid for a repitition of scan-window 206. The dynamic rank remains valid only within one service-window 202. Once the static ranking and dynamic ranking are determined, the corresponding transfer-requester is served based on its context-description. Each transfer leads to an "exhaustion" of the used token which will then only be "refreshed" at the beginning of the next scan-window.

Figure 4:
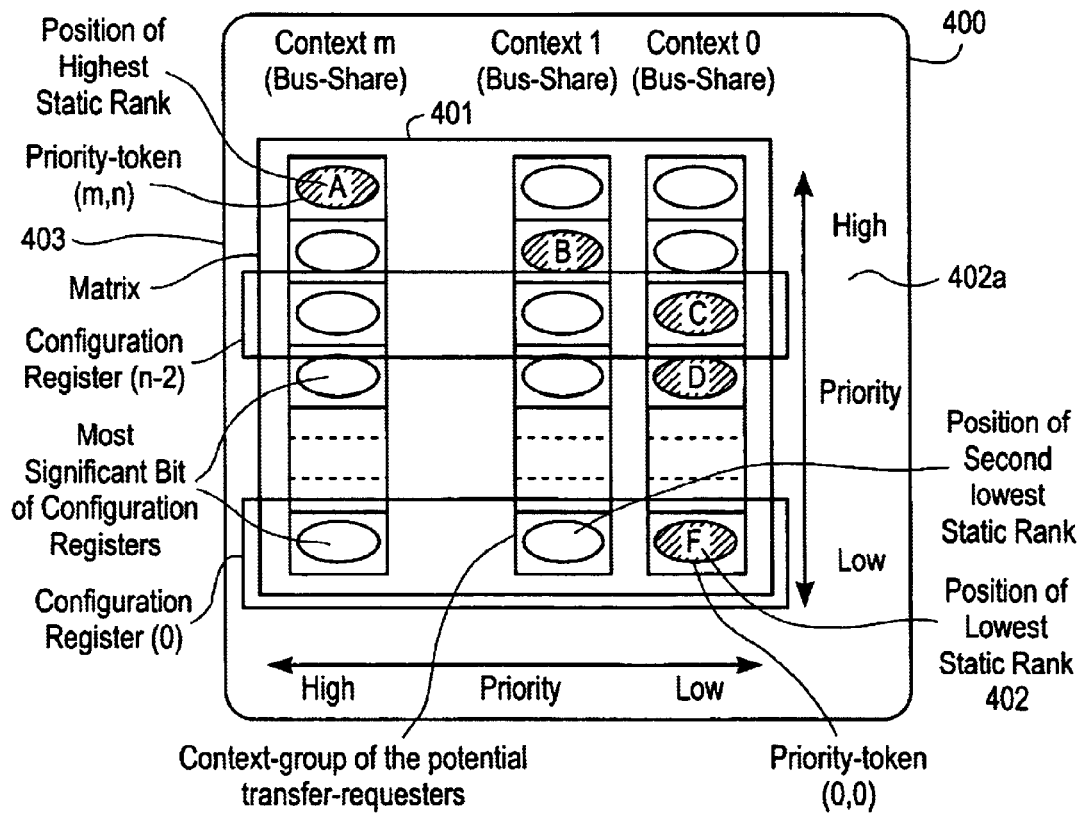
FIG. 4 is a diagram of an exemplary priority token matrix according to an implementation of the invention.

Turning now to FIG. 4, a diagram of an exemplary token matrix is shown. Shown are a plurality of rows 401 and columns 403. The token-column is associated with the context-group of the potential transfer-requesters. Thus there are "m+1" context-groups. The token-rows are associated with the configuration registers of the priority resolver.

The figure depicts (n+1) configuration registers 403 (Level 2) with the register-size (m+1). They form in the logical sense the matrix for the priority tokens. According to one implementation of the present invention, there are three level of registers for the matrix (and two level for the remaining context). The registers at level 2 act as the main working registers; the register at level 0 and level 1 act as shadow-register stages. A device-embedded controller (not shown) sets a priority-token by writing a one to the respective bit-position of the register (Level 0)—the Most Significant Bit-positions of the register correspond with the context "m" as the Least Significant Bit-positions correspond with the context "0".

The highest static rank is at the matrix-position (Column=m|Row=n); the second highest is at the position (Column=m−1; Row=n), continuing down to the lowest static rank available at the matrix-position (Column=0|Row=0). The static rank and priority tokens are assigned upon system configuration via a configuration interface (FIG. 2).

Operation of the priority resolution scheme is illustrated by way of example. As shown in the example of FIG. 4, five (5) priority-tokens have been assigned: Priority-token "A" to transfer-requester "m" (with the corresponding context "m"); Priority-token "B" to transfer-requester 1 (with the corresponding context "1") and Priority-token "C", "D", and "F" to transfer-requester 0 (with the corresponding context 0). It is assumed that the scanwindow is just about to start. Next, it is assumed that there were two competing requests scanned within the same service-window: One from transfer-requester 1, one from transfer-requester 0. In the first round the "fresh" tokens with the highest static rank of each context-group are determined. In this example these are the token B and the token C. In the next logical step the static rank of these tokens are compared: Token B has the higher static rank than token C. This results in the highest dynamic rank for the transfer requester 1. Thus the requested transfer is granted and will be "executed" as described in the related context. Token B remains then "exhausted" for this scan-window—e.g., it is now represented by a reset bit. In the next service-window, the request of transfer-requester 0 will probably be scanned again—as there was no service granted. However it might be that at this time a request of transfer-requester "m" was also scanned which would result in servicing transfer-requester "m" first. If this were not the case the service to transfer-requester 0 would be granted.

Figure 5:
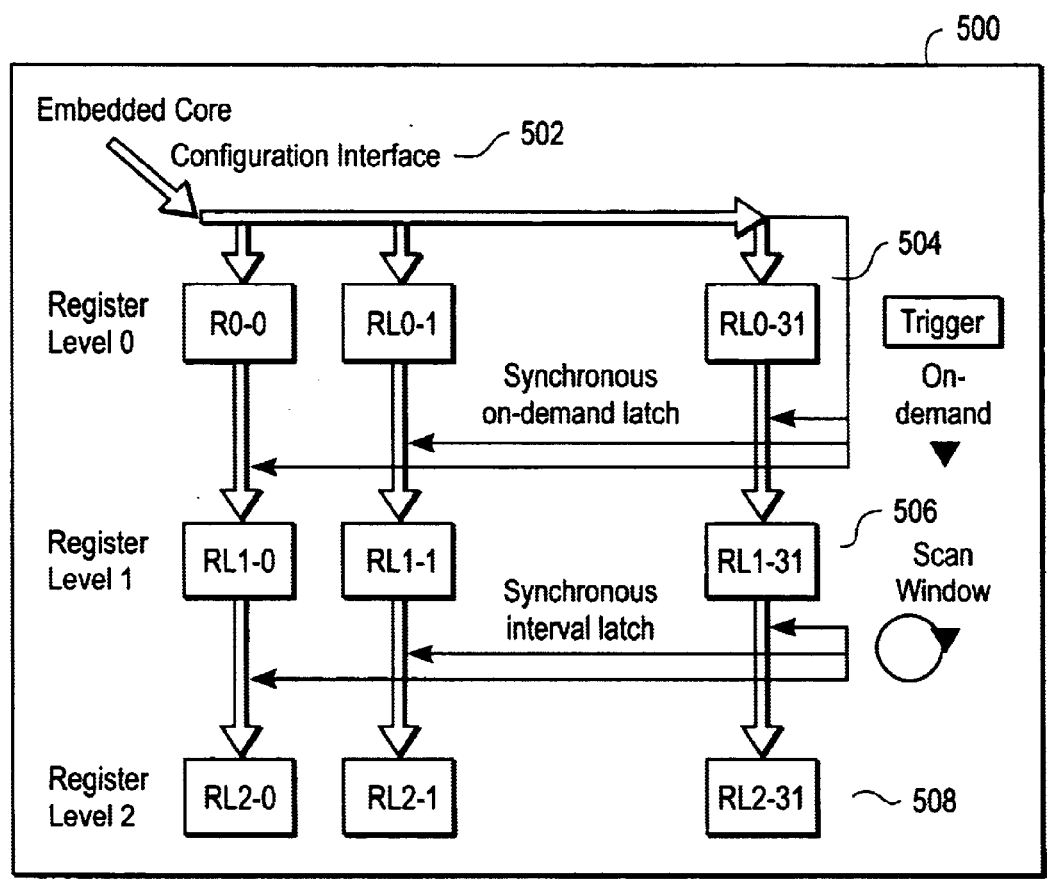
FIG. 5 is a diagram illustrating register stages according to an implementation of the invention.

As noted above, the working register level is Level 2. The register levels 500 are illustrated in FIG. 5. Shown are Register Level 0 (504), Register Level 1 (506), and Register Level 2 (508). The registers 504 of Register Level 0 are sequentially initialized by the embedded controller (not shown) via the configuration interface 502. That is, the desired size of the scan-window is communicated and the context information is initialized. The scan window size may (but need not) correspond to the tokens actually assigned (a different value could be used to compensate a different size of the block-transfers).

Once the initialization is complete, a command-instruction triggers a synchronous latching from the registers 504 of Register Level 0 to the registers 506, 508 at Register Level 1 and Register Level 2, respectively. At the same time the new context-information will be loaded. The scan-window will be reset to start at the service-window "zero".

The registers 508 at Register Level 2 will start performing as the actual working-registers: Once it is determined that a request shall be granted, the corresponding bit is reset by the corresponding logic. All bits are refreshed at the end of the scan-window using the original configuration at Register Level 1. Then a new scan-window will start from the beginning.

As noted above, context machine 116 determines how the transfer is to be performed. Once a transfer request priority has been resolved, the context associated with the transfer is read As shown in FIG. 6 and FIG. 7, a transfer request is serviced based on one of six main contexts 502a–f and several dynamically selected subcontexts 504a–d. The main contexts are bus share 502a, priority class 502b, listen-mode 502c, transfer size 502d, increase address 502e, and basic source address (BSA) 502f. The subcontexts are cast type 504a, and four each of static offsets to the basic source address 504b and destination addresses 504c.

The bus share context 502a has been described above and includes a plurality of settings (FIG. 7) to allow reservation of predetermined bus bandwidth.

According to the implementation illustrated, two priority contexts 502b are used: Standard 506a and preferred 506b. If standard 506a is used, the priority of a transfer-request will be granted on the basis of an available token with the highest dynamic rank, as described above.

If preferred 506b is used, bus-requests are immediately served. A transfer already started is not interrupted, but the use of the priority matrix does not apply. That means that until the very beginning of the next transfer, decisions based on priority-tokens could be overruled by the transfer-requester with "preferred"—context. If this mode is used one Priority-token less than "n" must be used for the matrix-initalization -the scan-window will remain the same.

Three listen mode values 502c are defined: OAM (Operations, Administration, and Maintenance)-listen 506c, Debug-Listen 506d, and OAM-Listen and Debug-Listen 506e. These signals can be used, e.g., to trigger a statistics-counter (not shown) or for debug-related operations.

OAM-Listen: On related transfers the signal OAM-listen will be asserted.

Debug-Listen: On related transfers the signal Debug-listen will be asserted.

OAM-Listen and Debug-Listen: On related transfers both signals will be asserted.

The transfer size value 506e specifies the block-transfer size, where "n" relates to the buswidth, i.e., how many bytes would be transferred by a single transfer.

The Increase Address value 502e case can be used to increase either source address 506f, increase destination address 506g or increase both addresses 506h within a block-transfer. This can be used for fly-by tranfers in conjunction with directly bus-interfaced RAM-areas.

The Basic Source Address value 504b represents the Basic Source Address from which data will be transferred. To this address the offset is added.

The four different static offsets to Basic-Source Adress (BSA) 504b describe the statically added offset to the source-address from which data will be transferred.

The four different Destination Addresses 504c describe the addresses to which the data will be tranferred.

Two types of cast-types 504a are defined: cell transfer 506i and frame transfer 506j. As described above, when the frame transfer mode is used, the frame transfers are counted using the downcounter, and a frame end signal is asserted when the transfer is complete. The frame elements are then interleaved with cells on the bus, for example, using the prioity assignment described above.

The frame length field 506k expresses the frame-length. This information is required to determine when the frame-end signal shall be asserted.

The Frame-length Descriptor field 506l provides a pointer to a total length or payload length. More particularly, frame-based protocols (e.g. IP-v4 with the 2-Byte Total Length (TL) or IP-v6 also with a 2-Byte Payload length (PL)) have a field which indicates the frame-length. This field provides a pointer to the beginning of this field to fetch TL/PL.

The frame-length field size field 506m describes the length of the frame length indicator (e.g. in the example listed above 2 Bytes). Offset is internally added to gain the appropriate counter-value.

The invention described in the above detailed description is not intended to be limited to the specific form set forth herein, but is intended to cover such alternatives, modifications and equivalents as can reasonably be included within the spirit and scope of the appended claims.

What is claimed is:

1. A direct memory access LDMA) controller, comprising:
   a bus;
   priority resolver adapted to resolve concurrent data transfers on the bus and grant a given data transfer access to the bus on a prereserved basis using tokens, a token having been previously assigned to each data transfer through p configuration interface, each token having a static rank and a dynamic rank, the static rank of a token being based on a position within a matrix of ((m+1)×(n+1)) configuration bits, wherein n represents a number of configuration registers and m represents a size of each of the configuration registers, the dynamic rank of a token being based on a comparison of the static rank of pending concurrent data transfers;
   a bus sniffer adapted to identify a cast type of a granted data transfer on the bus, a cast type being whether a given data transfer on the bus pertains to a frame transfer or a cell transfer, a frame being an Internet Protocol (IP) data packet having an arbitrary length, a cell being an asynchronous transfer mode (ATM) data packet of a fixed length; and
   a context machine adapted to store request contexts for data transfers on the bus, and adapted to serve a granted data transfer on the bus based on a context corresponding to the granted data transfer;
   wherein the priority resolver unit is adapted to read a the cast type associated with each granted data transfer and interleave ATM data packets and IP data packets on the bus.

2. A direct memory access controller in accordance with claim 1, wherein the priority is further adapted to determine a frame length associated with an IP data packet prior to inserting a portion of the IP data packet into a cell stream.

3. A DMA controller in accordance with claim 2, wherein the priority resolver is adapted to interleave portions of IP data packets with ATM data packets on a byte by byte basis.

4. A DMA controller in accordance with claim 4, wherein the bus sniffer is adapted to assert an end of frame signal when a transfer of an IP data packet is complete.

5. A DMA controller in accordance with claim 3, wherein the DMA controller further comprises a down counter, wherein the down counter counts down for each transfer of a portion of a given IP data packet a transfer being a number of bytes of the IP data packet that can be transferred in parallel on the bus.

6. A DMA controller in accordance with claim 2, wherein a highest static rank is at a matrix position (m×n), continuing down to a lowest static rank at a matrix position (0×0).

7. A direct memory access method, comprising:
   resolving concurrent data transfers on a bus and granting a given data transfer access to the bus on a prereserved basis using tokens, a token having been previously assigned to each data transfer through a configuration interface, each token having a static rank and a dynamic rank, the static rank of a token being based on a position within a matrix of ((m+1)×(n+1)) configuration bits, wherein n represents a number of configuration registers and m represents a size of each of the configuration registers from (0, 1, . . . m) the dynamic rank of a token being based on a comparison of the static rank of pending concurrent data transfers;
   identifying a cast type of a granted data transfer on the bus, a cast type being whether a given data transfer on the bus pertains to a frame transfer or a cell transfer, a frame being an Internet Protocol (IP) data packet having an arbitrary length a cell being an asynchronous transfer mode (ATM) data packet of a fixed length;
   storing request contexts for data transfers and serving a granted data transfer based on a context corresponding to the granted data transfer; and
   reading a the cast type associated with each granted data transfer and transferring each granted data transfer including interleaving ATM data packets and IP data packets on the bus.

8. A method in accordance with claim 7, wherein the transferring further comprises counting down from a number equal to a frame size associated with an IP data packet divided by a number of bytes the can be transferred in parallel on the bus.

9. A method in accordance with claim 8, further comprising asserting an end of frame signal when the counter reaches a predetermined count.

10. A method in accordance with claim 7, wherein interleaving ATM data packets and IP data packets includes interleaving IP data packets with ATM data packets on a byte by byte basis.

11. A method in accordance with claim 7, wherein a highest static rank is at a matrix position (m×n), continuing down to a lowest static rank at a matrix position (0×0).

12. A direct memory access (DMA) controller, comprising:

means for resolving concurrent data transfers on a bus and granting a given data transfer access to the bus on a prereserved basis using tokens, a token having been previously assigned to each data transfer through a configuration interface, each token having a static rank and a dynamic rank, the static rank of a token being based on a position within a matrix of ((m+1)×(n+1)) configuration bits, wherein n represents a number of configuration registers and m represents a size of each of the configuration registers, the dynamic rank of a token being based on a comparison of the static rank of pending concurrent data transfers;

means for identifying a cast type of a granted data transfer on the bus, a cast type being whether a given data transfer on the bus pertains to a frame transfer or a cell transfer, a frame being an Internet Protocol (IP) data packet having an arbitrary length, a cell being an asynchronous transfer mode (ATM) data packet of a fixed length;

means for storing request contexts for data transfers and serving a granted data transfer based on a context corresponding to the granted data transfer; and means for reading a the cast type associated with each granted data transfer and transferring each granted data transfer including interleaving ATM data packets and IP data packets on the bus.

13. A DMA controller in accordance with claim 12, wherein the means for reading and transferring further further comprise means for counting down from a number equal to a frame size associated with an IP data packet divided by a number of bytes the can be transferred in parallel on the bus.

14. A DMA controller in accordance with claim 13, further comprising means for asserting an end of frame signal when the counter reaches a predetermined count.

15. A DMA controller in accordance with claim 12, wherein a highest static rank is at a matrix position (m×n), continuing down to a lowest static rank at a matrix position (0×0).

* * * * *